United States Patent [19]

Casper et al.

[11] Patent Number: 4,472,558

[45] Date of Patent: * Sep. 18, 1984

[54] PROCESS FOR CARRYING OUT REACTIONS CAUSED BY THE TRANSPORT OF SUBSTANCES

[75] Inventors: Clemens Casper, Krefeld; Henning Klussmann, Rommerskirchen; Günter Lehr; Johannes O. Sajben, both of Krefeld; Artur Reischl, Leverkusen; Rudolf Binsack, Krefeld; Frank Wingler, Leverkusen, all of Fed. Rep. of Germany

[73] Assignee: Bayer Aktiengesellschaft, Leverkusen, Fed. Rep. of Germany

[*] Notice: The portion of the term of this patent subsequent to Oct. 10, 1995 has been disclaimed.

[21] Appl. No.: 45,028

[22] Filed: Jun. 4, 1979

Related U.S. Application Data

[63] Continuation of Ser. No. 829,385, Aug. 31, 1977, abandoned.

[30] Foreign Application Priority Data

May 4, 1977 [DE] Fed. Rep. of Germany ....... 2719967

[51] Int. Cl.$^3$ ................................................ C08F 2/06

[52] U.S. Cl. ......................................... 526/64; 526/88
[58] Field of Search ..................................... 526/64, 88

[56] References Cited

U.S. PATENT DOCUMENTS 3,550,669 12/1970 Lippert et al. ........................ 159/6
3,834,441 9/1974 Vernaleken et al. ................. 159/49
4,119,613 10/1978 Reischl et al. ........................ 526/64

FOREIGN PATENT DOCUMENTS 2461164 6/1976 Fed. Rep. of Germany ........ 526/64
47-13369 4/1972 Japan .................................... 526/64

Primary Examiner—Paul R. Michl
Attorney, Agent, or Firm—Gene Harsh; Joseph C. Gil

[57] ABSTRACT

This invention relates to a process for carrying out reactions which primarily occur during the transport of compounds in the liquid phase or at the liquid-gas interface. Starting components are reacted with one another and/or with gases of the inner space in a multi-phase flow tube having a liquid ring flow which may contain dissolved and/or dispersed constituents. Any necessary heat exchange takes place between the liquid and the wall of the tube or the gases.

9 Claims, No Drawings

PROCESS FOR CARRYING OUT REACTIONS CAUSED BY THE TRANSPORT OF SUBSTANCES

This is a continuation of application Ser. No. 829,385 filed Aug. 31, 1977, abandoned.

This invention relates to a process for carrying out reactions which primarily occur during the transport of compounds in the liquid phase or at the liquid-gas interface. Starting components are reacted with one another and/or with gases of the inner space in a multi-phase flow tube having a liquid ring flow which may contain dissolved and/or dispersed constituents. Any necessary heat exchange takes place between the liquid and the wall of the tube or the gases.

BACKGROUND OF THE INVENTION

For carrying out a reaction process, systems are required in which the individual particles of the reactants may quickly be brought into close contact with one another. This requires thin layers for keeping the transport paths short and for making the surface area of the process space large. This also requires intensive mixing within the layer, removal of unnecessary components from the reaction zone, and rapid heat exchange.

There are a number of processes for carrying out reactions which take place in the liquid phase or at the interface between the liquid and the gas phase.

A process employing a stirrer-equipped vessel is generally used in the present state of the art. The components are introduced into the stirrer-equipped vessel along various points thereof and the individual particles are brought into contact with one another by circulating the mixture by means of rotating stirrers. The heat is introduced and dissipated through the walls of the vessel.

Unfortunately, this process is attended by several disadvantages. These include the long transport paths within the phase, the non-uniform treatment of the product, the wide residence time spectrum, the poor heat and mass exchange, the high investment costs and the operational unreliability attributable to the mechanical stirrers.

Another process employs the bubble column which is particularly suitable for interfacial reactions between gas and liquid. The bubble column consists of a multiplate column through which the liquid flows. Gas bubbles pass through the liquid on each plate. There is a large interface between liquid and gas where the reaction takes place. The heat is again introduced and dissipated through the walls of the tube. Disadvantages of this process include the fact that it is limited to low viscosity liquid media, to a large liquid volume, by poor heat exchange and by the inevitable back-mixing associated with a wide residence time spectrum.

A process which is particularly suitable for highly viscous products is carried out in a double-flighted or four-flighted screw. Due to the contra-rotation of the screws, the components are continuously mixed in an intensive manner. Heat is introduced through the screw shafts or through the walls and dissipated through the walls. Components which are no longer required may be drawn off through vapor domes. Disadvantages of this process include high costs, the fact that it is limited in its application to highly viscous products, the fact that there are rotating parts and the small phase separation surface. The energy generated by the screw shafts is also a troublesome factor in exothermic processes because it has to be dissipated as heat in addition to the heat generated by the reaction.

Reactions may also be carried out in a tube reactor which consists of straight tube sections separated by bends in which the liquid changes direction and, in doing so, is intensively mixed. The reaction takes place as the liquid flows through the tube. Heat exchange occurs directly with a heat carrier in the jacket space. Disadvantages of carrying out reactions in this way include the fact that the entire cross-section of the tube is filled with the product liquid, which necessitates long transport paths, the fact that mixing is limited to the curved sections and the fact that there is no possibility of mass exchange.

Other known tube reactors consists of several straight tubes joined together by bends. Reactors of this type, which are intended solely for gas-liquid reactions, may only be used with liquids of low viscosity. The danger of gas bubbles being entrained, resulting in different treatment of the individual product particles, is very considerable which reduces, on the one hand, the efficiency of the process and, on the other hand, the quality of the product.

An object of the present invention is to provide a process in which starting components, of which at least one must be a liquid, are brought into contact with one another in a static apparatus so intensively, even with high viscosity levels, that one or more reactions take place at high velocity. All the secondary gases and vapors which accumulate during the process and which are no longer required should be directly removed from the reaction zone and the optimum reaction heat should be able to be adjustable by heat exchange over the shortest possible distance.

DESCRIPTION OF THE INVENTION

According to the present invention, this object is achieved by reacting starting components with one another and/or with one or more gases in the inner space of a multi-phase flow tube having a liquid ring flow which may contain one or more dissolved and/or dispersed constituents, any heat exchange necessarily taking place between the liquid and the wall of the tube or the gas or gases, wherein, for an absolute pressure of from 10 mm bar to 100 bar, the uninterrupted thin-layer ring flow flowing with a viscosity of from 10 to 10,000 P through a multi-phase flow tube with a continuous coil shape having a tube diameter of from 3 to 100 mm, preferably from 40 to 50 mm, and a diameter-to-length ratio of from 1:400 to 1:2000, has a circular flow between the surface of the liquid and the wall of the tube superimposed on it by a gas stream flowing at from 20 m/sec. to the speed of sound in order to intensify the transport of substances during the reaction and wherein the gas stream accelerates the liquid to an average residence time of less than 8 minutes, preferably less than 2 minutes, and at the same time carries off any secondary gases and vapors accumulating during the process.

The advantages afforded by the present invention lie in the fact that, once in operation, the thin-layer ring flow remains intact over the entire length of the continuously coiled multi-phase flow tube under the effect of its centrifugal forces. A circular flow directed transversely of the ring flow between the wall of the tube and the surface of the liquid additionally provides for intensive mixing of the reaction components, for rapid separation of the gaseous secondary products accumulating during the reaction, and for an almost immediate exchange of heat through the wall of the tube or the gas stream. The reaction may then take place under optimum conditions. Accordingly, high, specific yields are obtained.

It is also surprising that liquids having a viscosity of up to 10,000 Poises may be moved solely by a gas stream, i.e., without the assistance of expensive mechanical conveying means, through a long tube without caking which may cause product damage caused by overheating and without the thin liquid layer breaking up. Under the effect of the centrifugal forces, the gas stream is free from liquid. Another advantage is that no back-mixing occurs. A high-quality end product is obtained in the same residence time due to the uniform passage of the liquid through the multi-phase flow tube.

The apparatus is compact and simple in structure. By virtue of the absence of any rotating parts in the product stream, the multi-phase flow tube is reliable in operation.

In one particular embodiment of the process, substances are added to or gases are removed from the gas stream at certain intervals.

By adding reaction components, catalysts and/or tempered blowing gases through nozzles arranged at certain intervals in the gas stream, it is possible to influence the course of the reaction in sections by pressure, temperature and throughflow rate. By contrast, it is advisable in other cases to remove gases or vapors in order to lower the pressure or to reduce the rate of flow of the gas stream. By stream lined designing the conduits leading through the wall of the tube, the ring flow is prevented from breaking up.

In another embodiment of the process, partly or completely inert or slightly polar solvents or solvent mixtures, optionally heated under pressure, are added as the gas stream.

By using certain gases or vapors, it is possible to influence both the reaction and the pressure, temperature and rate of gas flow independently of one another in order to optimize process conditions.

In another embodiment of the process, the product-specific temperature profile is adjusted by heating or cooling the coiled multi-phase flow tube in sections.

By the exact control of temperature, it is possible to obtain a maximum yield in that the reaction velocity and decomposition rate are optimally adjusted. At the same time, it is possible to avoid product damage caused by overheating.

In another embodiment of the process, starting components pre-react in a first reaction stage before entering the coiled multi-phase flow tube up to a conversion of from 30 to 80%, preferably from 50 to 70%, of the total reaction conversion.

In some cases, it is economical to carry out a preliminary reaction in a vessel. In that case, the further reaction takes place in a continuously coiled multi-phase flow tube on account of the higher viscosity of the liquid.

In another embodiment of the process, the end product is after-reacted and/or subsequently degassed in a screw device following the multi-phase flow tube.

The highly viscous product is completely degassed in the above-mentioned screw which is of considerable advantage to the end product. At the same time, an after-reaction may be carried out in the case of highly viscous products. It is also possible to carry out a backward degassing operation through the screw.

Embodiments of the present invention are described in detail in the following.

The liquid starting components are mixed and, if necessary, pre-reacted in a stirrer-equipped vessel. After the necessary heat treatment in a heat exchanger, the mixture is allowed to expand into the multi-phase flow tube to form a vapor and/or is introduced together with gas into the multi-phase flow tube, wherein the tube has the shape of an always curved coil. A ring flow is developed and flows continuously through the multi-phase flow tube. The reaction takes place within the liquid layer and/or at the liquid-gas interface. The necessary heat exchange takes place through the wall of the tube and/or through the gas stream flowing in the ring flow which, at the same time, also carries off the gaseous secondary products which are no longer required. Gas and liquid are separated in the following separator or in a screw. The following examples are running in the described manner.

EXAMPLE 1

1. Type of reaction: Polyaddition
2. Starting material:
   30 parts, by weight, of polyester (adipic acid/1,3-butane diol; OH number 52.2; acid number 0.6)
   52.9 parts, by weight, of toluene
   0.48 parts, by weight, of 1,4-butane diol
   4.84 parts, by weight, of diphenylmethane-4,4'-diisocyanate
3. End product and characteristics:
   polyurethane polymer solution
   final viscosity 1110 $cP_{20°\,C.}$, 15% in methylethyl ketone
4. Conditions:
   temperature on entry (°C.): 190
   temperature on exit (°C.): 190
   Pressure on entry (bars): 7
   Pressure on exit (bars): 0.15
5. Geometry: continuously coiled tube
   tube diameter (m): $14 \cdot 10^{-3}$
   tube length, extended (m): 9
   tube diameter/coil diameter (/): 0.1
6. Capacity:
   throughput (kg/h): 30
   conversion (kg/h): 0.995
   residence time (mins.): 1
7. Other remarks:
   Pre-mixing in the stirrer-equipped vessel
   Discharge through wide-jawed gear pump
   Parallel evaporation of the toluene in the flow tube

EXAMPLE 2

1. Type of reaction: Catalytic polyaddition
2. Starting material:
   30 parts, by weight, of polyester (adipic acid/1,6-hexane diol; OH number 133.3; acid number 0.7)
   54.4 parts, by weight, of toluene
   6.44 parts, by weight, of tolylene diisocyanate
   0.012 parts, by weight, of trimethylol propane
   0.0005 parts, by weight, of iron(III) acetyle acetonate
3. End product and characteristics:
   polyurethane;
   final viscosity: 44,300 $cP_{20°\,C.}$; 30% in ethyl acetate
4. Conditions:
   temperature on entry (°C.): 190
   temperature on exit (°C.): 190
   pressure on entry (bars): 6.5
   pressure on exit (bars): 0.1

5. Geometry: continuously coiled tube
   tube diameter (m): $14 \cdot 10^{-3}$
   tube length, extended (m): 9
   tube diameter/coil diameter (/): 0.1
6. Capacity:
   throughput (kg/h): 30
   conversion (kg/h): 0.99
   residence time (mins.): 1
7. Other remarks:
   Pre-mixing in the stirrer-equipped vessel
   Discharge through wide-jawed gear pump
   Parallel evaporation of the toluene in the two-phase flow tube

EXAMPLE 3

1. Type of reaction: two-stage polyaddition
2. Starting product:
   1st stage:
     20 parts, by weight, of hexane diol polycarbonate (OH number 112.5; acid number 0.1)
     20 parts, by weight, of polypropylene glycol ether
     9.4 parts, by weight, of tolylene diisocyanate
     0.016 parts, by weight, of trimethylol propane
     0.0006 parts, by weight, of iron acetyl acetonate
   2nd stage:
     0.219 kg/h of 1,4-butane diol
     49.4 parts, by weight, of toluene
3. End product and characteristics:
   polyurethane
   final viscosity 39,800 cP$_{20°}$ $_C$; 30% in ethyl acetate
4. Conditions:
   temperature on entry (°C.): 190
   temperature on exit (°C.): 190
   pressure on entry (bars): 7
   pressure on exit (bars): 0.1
5. Geometry: continuously coiled tube
   tube diameter (m): $14 \cdot 10^{-3}$
   tube length, extended (m): 9
   tube diameter/coil diameter (/): 0.1
6. Capacity:
   throughput (kg/h): 30
   conversion (kg/h): 0.99
   residence time (mins.): 1
7. Other remarks:
   1st stage in the stirrer-equipped vessel; 15 minutes at 120° C.
   Butane diol mixed in downstream of preheater
   Discharge through wide-jawed gear pump
   Parallel evaporation of the toluene in the flow tube.

EXAMPLE 4

1. Type of reaction: polycondensation
2. Starting material:
   Storage Vessel 1
     1944 parts, by weight, of urea
     2043 parts, by weight, of melamine
     6570 parts, by weight, of formalin
   Storage Vessel 2
     21586 parts, by weight, of polyether (propylene oxide - ethylene oxide)
     53 parts, by weight, of 85% phosphoric acid
     29 parts, by weight, of 1N sodium hydroxide
3. End product and characteristics:
   20% aminoplast dispersion in polyether
   final viscosity: 1740 cP 25° C.
4. Conditions:
   temperature on entry (°C.): 100
   temperature on exit (°C): 100
   pressure on entry (bars): 4
   pressure on exit (bars): 0.02
5. Geometry: continuously coiled tube
   tube diameter (m): $9 \cdot 10^{-3}$
   tube length, extended (m): 6
   tube diameter/coil diameter (/): 0.15
6. Capacity:
   throughput (kg/h): 6.5
   conversion (kg/h): 1.0
   residence time (mins.): 0.6
7. Other remarks:
   Preparation of the reaction mixture in static mixers (from storage vessel 1: 35.2 gr/min.; from storage vessel 2: 71.95 gr/min.)
   Parallel evaporation of the water in the flow tube.

EXAMPLE 5

1. Type of reaction: anionic bulk polymerization
2. Starting product:
   99% of styrene, 1% of tetrahydrofuran
   initiator: 195 m Mole/h of butyl lithium 1 m in hexane
   stopper: 225 g/h of methanol
3. End product and characteristics:
   polymer
   intrinsic viscosity 25° C. in THF, dl/g: 0.65
   melt index 200° C.; 21.6 kp, ASTM D 1238-65 T g: 10
   flexural strength DIN 53453, kp/cm$^2$: 1100
4. Conditions:
   temperature on entry (°C.): 20
   temperature on exit (°C): 220
   pressure on entry (bars): 6.4
   pressure on exit (bars): 0.7
5. Geometry: continuously coiled tube:
   tube diameter (m): $17 \cdot 10^{-3}$
   tube length, extended (m): 19
   tube diameter/coil diameter (/): 0.1
6. Capacity:
   throughput (kg/h): 30
   conversion (kg/h): 0.75
   residence time (mins.): 3
7. Other remarks:
   Residual monomers are evaporated
   Discharge through screw

EXAMPLE 6

1. Type of reaction: copolymerization
2. Starting product:
   20% solution of styrene-acrylonitrile (SAN) (20 parts, by weight, of ACN+62 parts, by weight, of K styrene) having solution viscosity (DMF) L-value 90 and molecular inconsistency factor Un=0.9 in a mixture of 40% by weight, of acrylonitrile (ACN) and 60%, by weight, of styrene and/or additions of regulators and activators (for example, 0.05% of DDM, n-dodecyl mercaptan)
3. End product and characteristics:
   SAN-copolymers containing 28% of ACN of L-value 70 and Un 1.9, residual monomer content 0.5% appearance: transparent, colorless
4. Conditions:
   temperature on entry (°C.): 142° C.
   temperature on exit (°C.): 160° C.
   pressure on entry (bars): 14 bar
   pressure on exit (bars): 100 mm bar
5. Geometry: continuously coiled tube
   tube diameter (m): 0.015
   tube length, extended (m): 6.7
   tube diameter/coil diameter (/): 0.5 m 6. Capacity:
   throughput (kg/h): 7.0
   conversion (kg/h): 4.2
   residence time (mins.): 5 minutes

What is claimed is:

1. A process for carrying out a reaction which primarily occurs during the transport of one or more compounds in the liquid phase or at a liquid-gas interface, which comprises reacting starting components with one another and/or with one or more gases in the inner space of a multi-phase flow tube having a liquid ring flow which may contain one or more dissolved and/or dispersed constituents, any heat exchange necessary taking place between the liquid and the wall of the tube or the gas or gases, wherein, for an absolute pressure of from 10 mm bar to 100 bar, the uninterrupted thin-layer ring flow flowing with a viscosity of from 10 to 10,000 P through a multi-phase flow tube with a continuous coil shape having a tube diameter of from 3 to 100 mm and a diameter-to-length ratio of from 1:400 to 1:2000, has a circular flow between the surface of the liquid and the wall of the tube superimposed on it by a gas stream flowing at a rate of from 20 m/sec. to the speed of sound in order to intensify the transport of substances during the reaction and wherein the gas stream accelerates the liquid to an average residence time of less than 8 minutes and at the same time carries off any secondary gases and vapors accumulating during the process.

2. The process of claim 1 in which tube diameter is from 40 to 50 mm.

3. The process of claim 1 in which the residence time is less than 2 minutes.

4. The process of claim 1 in which one or more substances are added to or one or more gases are removed from the gas stream at certain intervals.

5. The process of claim 1 in which substantially inert or slightly polar solvents or solvent mixtures, optionally heated and/ or under pressure, are added to the gas stream.

6. The process of claim 1 in which the product-specific temperature profile is adjusted by heating or cooling the coiled multi-phase flow tube in sections.

7. The process of claim 1 in which, before entering the coiled multi-phase flow tube, the starting components are pre-reacted in a first reaction stage up to a conversion of from 30 to 80% of the total reaction conversion.

8. The process of claim 7 in which the said conversion is from 50 to 70%.

9. The process of claim 1 in which the product is after-reacted and/or subsequently degassed in a screw device downstream of the multi-phase flow tube.

* * * * *